US009677428B2

(12) United States Patent
Holmes et al.

(10) Patent No.: US 9,677,428 B2
(45) Date of Patent: Jun. 13, 2017

(54) REMOVAL DEVICE

(71) Applicant: General Electric Company, Schenectady, NY (US)

(72) Inventors: James Bradford Holmes, Fountain Inn, SC (US); David Randolph Spracher, Simpsonville, SC (US); James Robert Hollis, Greenville, SC (US); Wayne David Sullivan, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 14/206,461

(22) Filed: Mar. 12, 2014

(65) Prior Publication Data

US 2015/0260043 A1 Sep. 17, 2015

(51) Int. Cl.

| | |
|---|---|
| ***B23P 6/00*** | (2006.01) |
| ***F01D 25/28*** | (2006.01) |
| ***B25B 5/10*** | (2006.01) |
| ***B25B 27/02*** | (2006.01) |

(52) U.S. Cl.

CPC ............ *F01D 25/285* (2013.01); *B25B 5/108* (2013.01); *B25B 27/026* (2013.01); *F05D 2230/70* (2013.01); *Y10T 29/49318* (2015.01); *Y10T 29/53796* (2015.01)

(58) Field of Classification Search

CPC .......... B23P 19/04; B23P 19/033; B23P 19/10

See application file for complete search history.

(56) References Cited

U.S. PATENT DOCUMENTS

| | | | | |
|---|---|---|---|---|
| 4,335,493 | A * | 6/1982 | Shivers, Jr. | B25B 27/02 29/254 |
| 4,476,861 | A * | 10/1984 | Dimakos | A61B 17/92 29/255 |
| 6,739,839 | B1 * | 5/2004 | Brown | F01D 5/141 416/223 A |
| 2010/0048370 | A1 * | 2/2010 | Sollami | B23B 31/003 483/65 |
| 2013/0186103 | A1 | 7/2013 | Jha et al. | |
| 2013/0189087 | A1 | 7/2013 | Spracher et al. | |
| 2015/0260043 | A1 * | 9/2015 | Holmes | F01D 25/285 29/889.1 |

* cited by examiner

*Primary Examiner* — Lee D Wilson

(74) *Attorney, Agent, or Firm* — Dority & Manning, P.A.

(57) ABSTRACT

A tool for removing a component from a turbomachine is provided. The tool includes a body having an alignment portion and a connection portion. The alignment portion defines a longitudinal axis and a cross sectional shape complementary to a slot defined in a rotor wheel of the turbomachine. When the tool is positioned in the slot, the connection portion is configured to contact the component. The tool additionally includes a force section connected to the body and configured to transfer a force to the connection portion in a direction substantially parallel to the longitudinal axis of the alignment portion.

20 Claims, 6 Drawing Sheets

REMOVAL DEVICE

FIELD OF THE INVENTION

The present disclosure relates generally to a tool for removing a component from a turbomachine.

BACKGROUND OF THE INVENTION

Industrial and power generation turbomachines include a casing that houses a turbine. The turbine includes a plurality of rotor blades, or buckets, positioned along a gas flow path through the turbine, the blades supported by a number of turbine rotor wheels. The rotor blades and wheels define a plurality of turbine stages. Turbomachines also include one or more combustors that generate hot gases. The hot gasses may pass through a transition piece toward the plurality of turbine stages. In addition to hot gases from the one or more combustors, gases at a lower temperature flow from a compressor toward a wheelspace of the turbine. The lower temperature gases provide cooling for the rotor wheels as well as other internal components of the turbine. In order to prevent hot gases from entering the wheelspace, the turbine includes near flow path seals arranged between adjacent rotor wheels or rotor blades. The near flow path seals may be configured to fit closely adjacent the rotor wheels or rotor blades to reduce the leakage of hot gasses from the gas path into the wheelspace.

Generally, each of the rotor blades for a given stage in the turbine are attached to the respective rotor wheel using a dovetail assembly—i.e., the base of the rotor blade has a shape that is complementary to a slot in the rotor wheel—allowing the dovetail end of the rotor blade to slide into the dovetail slot in the rotor wheel and be held in position during operation of the turbine. Additionally, in certain turbines the near flow path seals may be attached at their base to rotor wheels using a similar dovetail assembly. Such a construction can ensure proper alignment of the rotor blades and near flow path seals during operation of the turbomachine. However, once all of the near flow path seals are installed for a given seal member rotor, the base of the seals may not easily be accessible. Such a construction may create some difficulty when, for example, a maintenance worker needs to remove one or more of the near flow path seals. More particularly, with such a construction, a first near flow path seal may need to be damaged in order to remove it and gain access to the base of the adjacent near flow path seals.

Accordingly, a tool that could assist in removing one or more near flow path seals would be beneficial. Moreover, a tool that could assist in removing one or more near flow path seals while minimizing any damage thereto would be particularly useful.

BRIEF DESCRIPTION OF THE INVENTION

Aspects and advantages of the disclosure are set forth below in the following description, or may be obvious from the description, or may be learned through practice of the disclosure.

In one exemplary embodiment of the present disclosure a tool for removing a component of a turbomachine is provided. The tool includes a body and a force section. The body includes a connection portion configured to contact the component and an alignment portion defining a longitudinal axis and a cross-sectional shape. The cross-sectional shape of the alignment portion is complementary to a slot defined in a rotor wheel of the turbomachine. In addition, the force section is connected to the body and is configured to transfer a force to the connection portion of the body in a direction substantially parallel to the longitudinal axis of the alignment portion.

In one exemplary aspect of the present disclosure a method for removing a component of a turbomachine is provided. The method includes positioning a tool into a slot defined in a rotor wheel of the turbomachine such that a connection portion of the tool contacts the component. The tool defines a longitudinal axis. The method also includes applying a force to a force section of the tool, the force being transferred from the force section to the connection portion in a direction substantially parallel to the longitudinal axis of the tool. In addition, the method includes applying the force to the component of the turbomachine using the tool.

In another exemplary embodiment of the present disclosure an assembly for removing a component in a turbomachine is provided. The assembly includes a first rotor wheel, with the component being slidably coupled to the first rotor wheel. The assembly also includes a second rotor wheel positioned adjacent to the first rotor wheel, the second rotor wheel defining a slot. Additionally, the assembly includes a removal tool. The removal too includes a body, and the body includes a connection portion in contact with the component and an alignment portion positioned in the slot defined in the second rotor wheel. The alignment portion defines a longitudinal axis and a cross-sectional shape, with the cross-sectional shape being complementary to the slot defined in the second rotor wheel. The body also includes a force section connected to the body and configured to transfer a force to the connection portion of the body in a direction substantially parallel to the longitudinal axis of the alignment portion.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
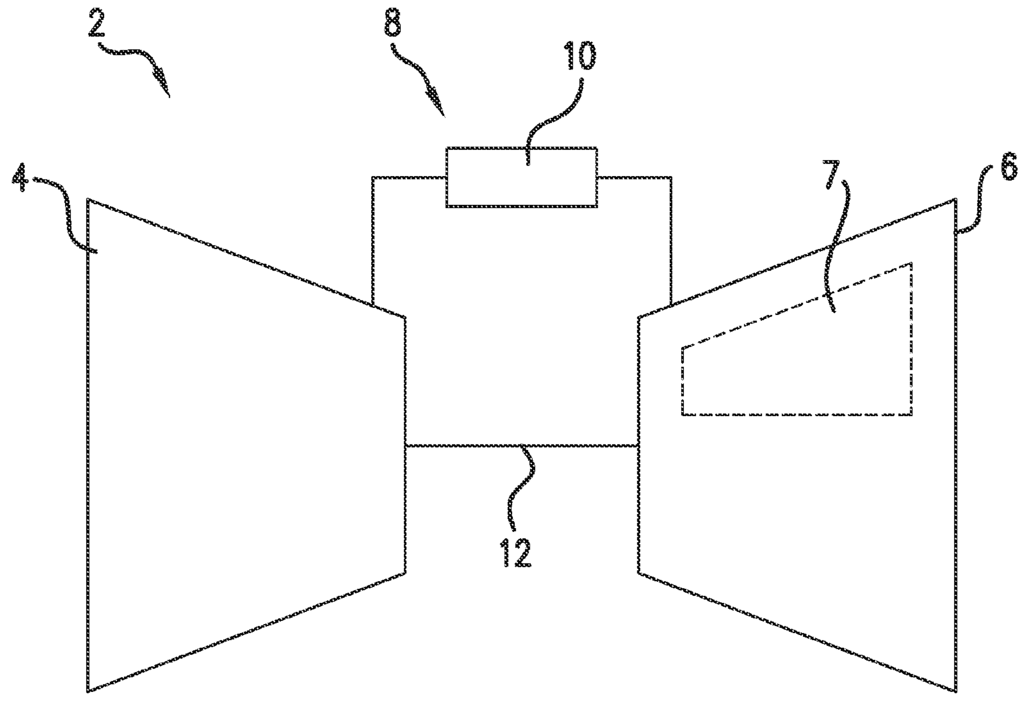
FIG. 1 is a functional diagram of an exemplary embodiment of a turbomachine of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference to FIG. 1, a turbomachine 2 constructed in accordance with an exemplary embodiment of the present disclosure is generally provided. The turbomachine 2 includes a compressor portion 4 operatively connected to a turbine portion 6. A combustor assembly 8 is fluidly connected to the compressor portion 4 and the turbine portion 6. The combustor assembly 8 may be formed from a plurality of circumferentially spaced combustors, one of which is indicated at 10. It should be appreciated, however, that in other exemplary embodiments, the combustor assembly 8 may include any other suitable arrangement of combustors 10.

The compressor portion 4 is also linked to the turbine portion 6 through a common compressor/turbine shaft 12. With this arrangement, the compressor portion 4 delivers compressed air to the combustor assembly 8. The compressed air may mix with a combustible fluid to form a combustible mixture. The combustible mixture may then be combusted in the combustor assembly 8 to form products of combustion that are delivered to the turbine portion 6 through a transition piece (not shown). The products of combustion expand through the turbine portion 6 to power, for example, a generator, a pump, an aircraft or the like (also not shown).

Figure 2:
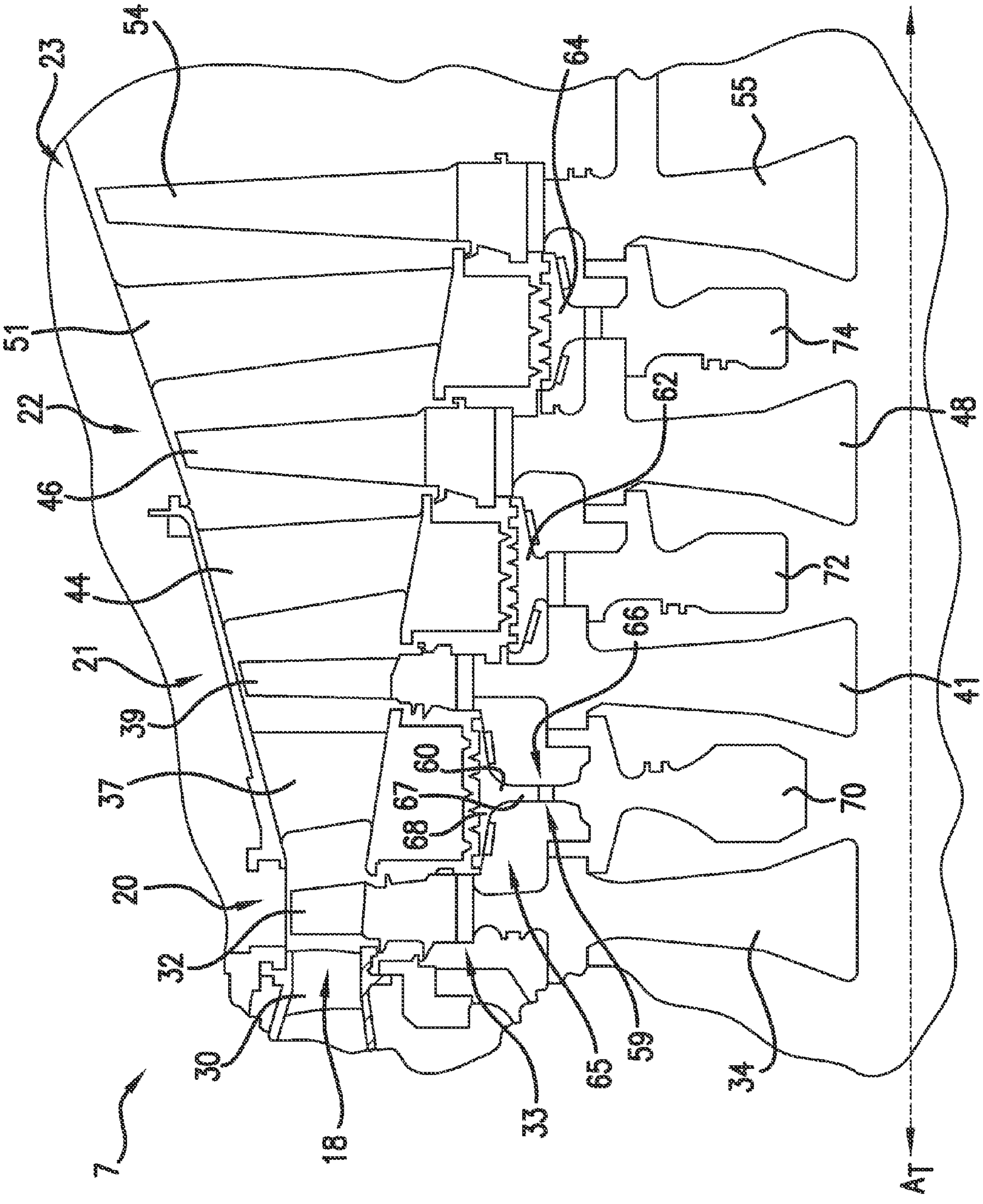
FIG. 2 is a cut-away view of a turbine portion of the exemplary turbomachine of FIG. 1.

A more detailed view of one section 7 of the turbine portion 6 of FIG. 1 is provided in FIG. 2. As shown, the turbine portion 6 includes first, second, third, and fourth stages 20, 21, 22 and 23 that define a gas path 18. The first stage 20 includes a plurality of first stage stators 30, or nozzles, and a plurality of circumferentially arranged first stage rotor blades 32, or buckets, mounted to a first stage rotor wheel 34. Similarly, the second stage 21 includes a plurality of second stage stators 37 and a plurality of circumferentially arranged second stage rotor blades 39 mounted to a second stage rotor wheel 41. In addition, the third stage 22 includes a plurality of third stage stators 44 and a plurality of circumferentially arranged third stage rotor blades 46 mounted to a third stage rotor wheel 48. Finally, the fourth stage 23 includes a plurality of fourth stage stators 51 and a plurality of circumferentially arranged fourth stage rotor blades 54 mounted to a fourth stage rotor wheel 55.

At the first stage 20 of the turbine portion 6, the rotor blades 32 are mounted to the respective rotor wheel 34 using a dovetail assembly. More particularly, the rotor blade 32 includes a dovetail member 33 at a first end of the rotor blade 32 and the rotor wheel 34 defines a dovetail slot 35. The dovetail member 33 has a shape that is complementary to the dovetail slot 35, such that the rotor blade 32 may be mounted to or removed from the rotor wheel 34 by sliding the dovetail member 33 of the rotor blade 32 generally along an axial direction $A_T$ of the turbomachine 2 into the dovetail slot 35 or out of the dovetail slot 25. The second, third, and fourth stage rotor blades 39, 46, and 53 are similarly mounted to rotor wheels 41, 48, and 55, respectively.

The turbine portion 6 also includes a plurality of near flow path seal members 60, 62, and 64 arranged between adjacent ones of the first, second, third, and fourth stages 20, 21, 22, 23 of the turbine portion 6. The near flow path seal members 60, 62, 64 are mounted to seal member rotor wheels 70, 72, and 74 and are configured to prevent an exchange of gases between the gas path 18 and a wheelspace 65 of the turbomachine 2. More particularly, as indicated in FIG. 2, near flow path seal members 60 are circumferentially arranged between the first stage 20 and the second stage 21 of the turbine portion 6, near flow path seal members 62 are circumferentially arranged between the second stage 21 and the third stage 22 of the turbine portion 6, and near flow path seal members 64 are circumferentially arranged between the third stage 22 and the fourth stage 23 of the turbine portion 6.

Similar to the means described for mounting the rotor blades 32 to the rotor wheel 43, the near flow path seal members 60 are mounted to the seal member rotor wheel 70 using a dovetail assembly. More particularly, the near flow path seal member 60 includes a dovetail member 61 at a first end 66 of the seal member 60, and the rotor wheel 70 defines a dovetail slot 71 (see also FIG. 4). The dovetail member 61 has a shape that is complementary to the dovetail slot 71, such that the near flow path seal member 60 may be installed or removed by sliding the dovetail member 61 of the near flow path seal member 60 generally along the axial direction $A_T$ of the turbomachine 2 into the dovetail slot 71 or out of the dovetail slot 71. In addition, the near flow path seal members 60 define a stem 67 extending from the first end 66 to an outer sealing portion 68 that prevents the exchange of gasses. The near flow path seal members 62 and 64 are similarly mounted to seal member rotor wheels 72 and 74, respectively.

It should be appreciated, however, that in other exemplary embodiments of the turbomachine 2, any suitable number of stages in the turbine portion 6 may be provided. For example, in other exemplary embodiments, the turbine portion 6 may only include three stages, i.e., three stages of rotor blades and rotor wheels, with two sets of near flow path seals positioned therebetween.

When removing the near flow path seals 60, it may generally be preferable to apply a force directly to the first end 66 of the seals 60 so as to minimize any moment created on the stem 67. However, due to the position of the near flow path seals 60 and rotor wheel 70 relative to first and second stage rotor wheels 34, 41, it may be difficult to access the first end 66 of the seals 60 when all of the circumferential seals 60 are mounted to the rotor wheel 70. Accordingly, in order to assist in removal of the near flow path seals 60, with reference now to FIG. 3, an exemplary tool 100 is provided, constructed in accordance with an exemplary embodiment of the present disclosure. As will be explained in greater detail with reference to FIGS. 4, 5, and 6, below, the tool 100 is configured to assist a user in exerting a three on the near flow path seals 60 in a linear direction so as to minimize any damage to the near flow path seals 60 during removal.

Figure 3:
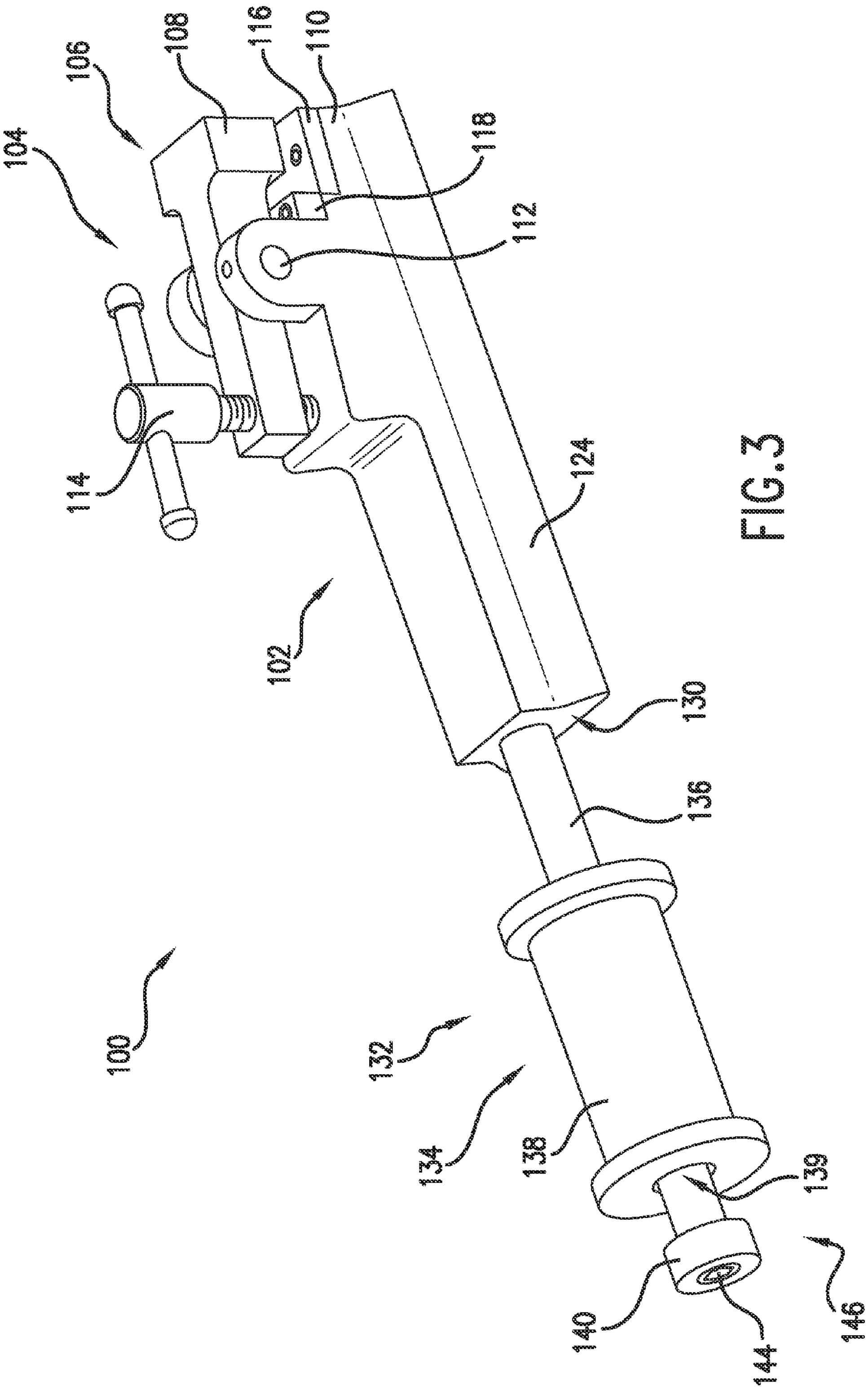
FIG. 3 is a perspective view of one embodiment of a removal tool of the present disclosure.
Figure 4:
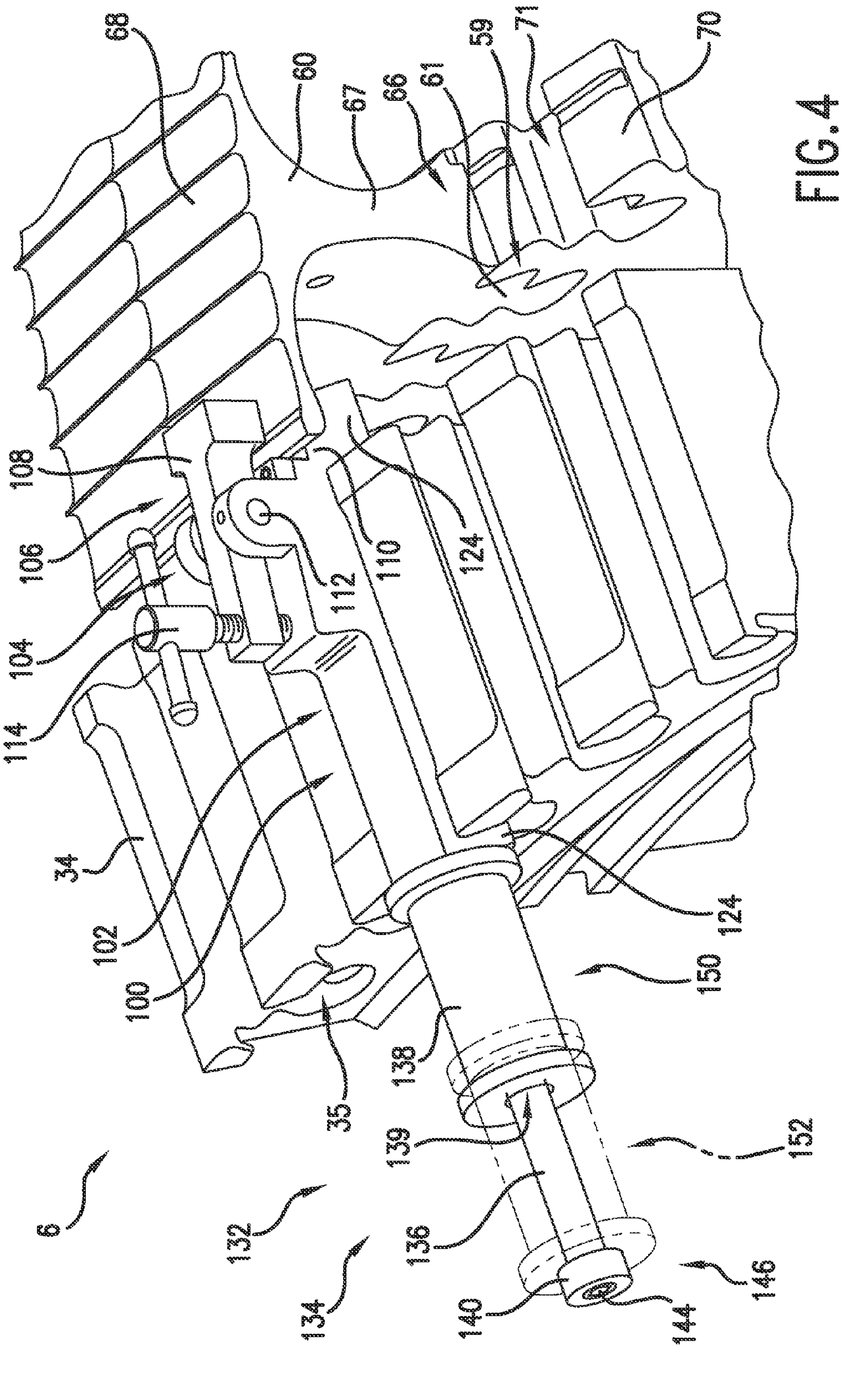
FIG. 4 is a perspective view of the removal tool of FIG. 3 positioned in a dovetail slot defined in a first stage rotor wheel of a turbine portion of an exemplary turbomachine.
Figure 5:
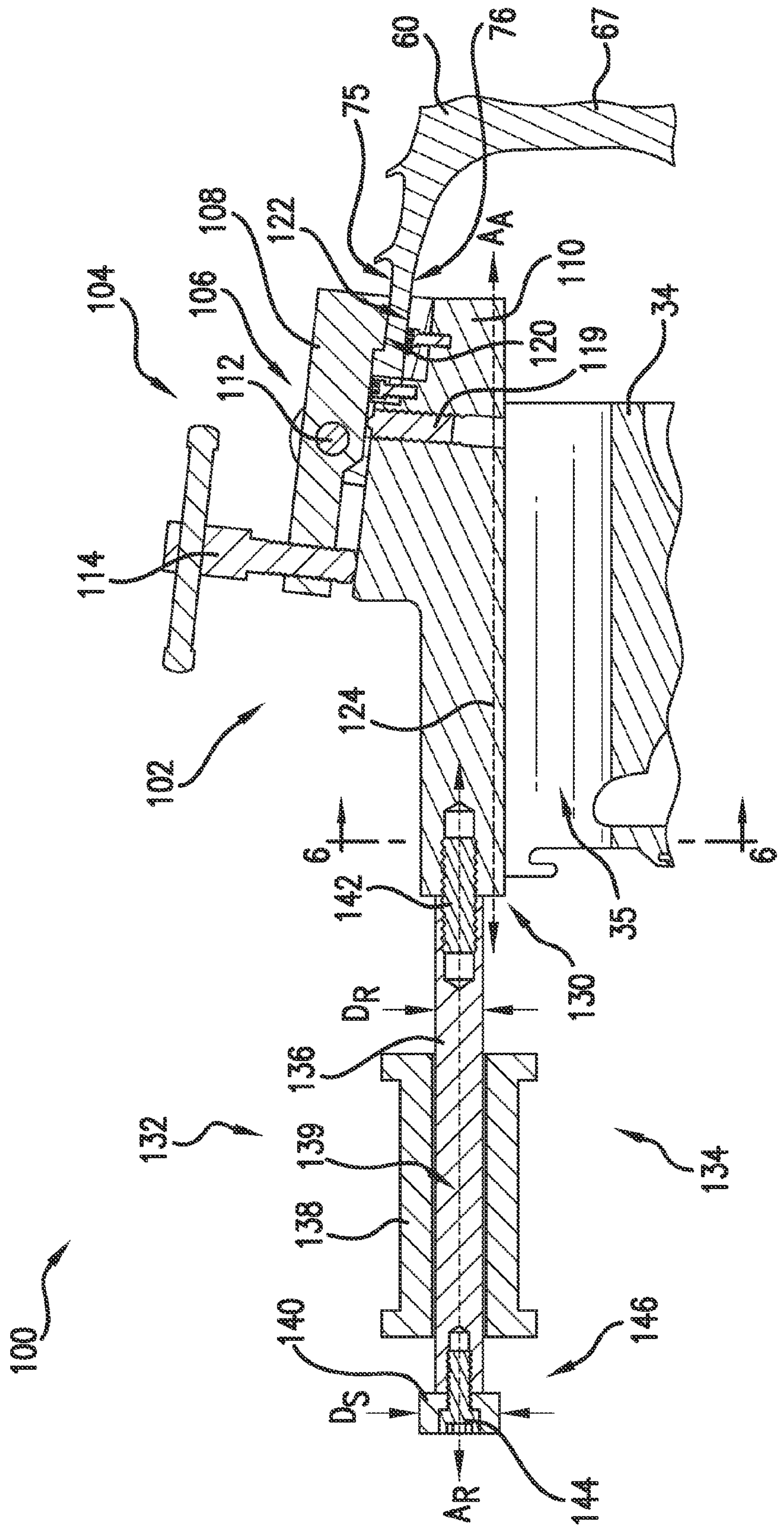
FIG. 5 is a cross-sectional view along a longitudinal axis of an alignment portion of the removal tool of FIG. 3, positioned in the first stage rotor wheel of the turbine portion of the exemplary turbomachine.
Figure 6:
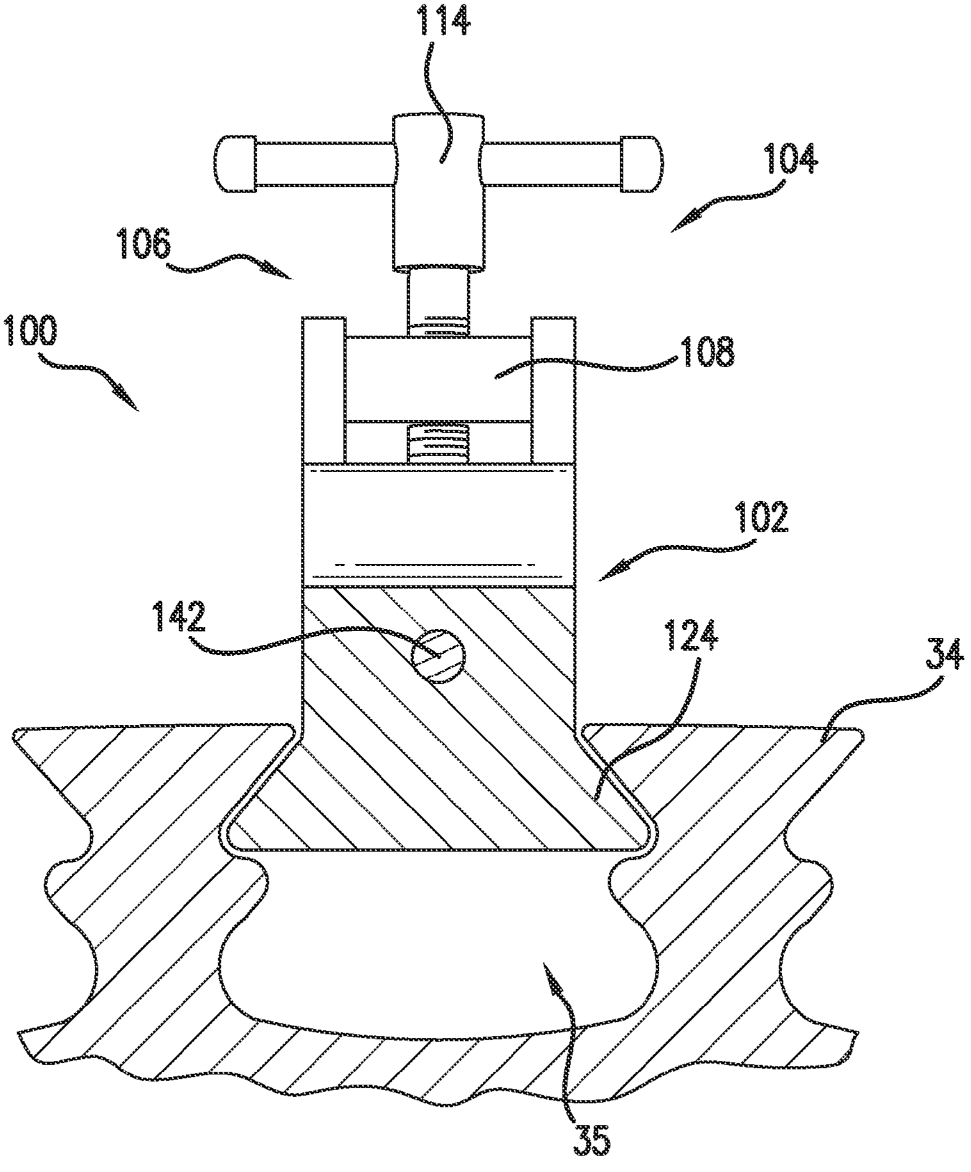
FIG. 6 is a cross-sectional view of the removal tool of FIG. 3 along line 6-6 shown in FIG. 5.

Referring now to FIGS. 4, 5, and 6, the exemplary tool 100 of FIG. 3 is shown positioned in a dovetail slot 35 defined in the first stage rotor wheel 34 and attached to a near flow path seal 60 positioned between the first and second stages 20, 21 of the turbine section 6. FIG. 4 provides a perspective view of the tool 100; FIG. 5 provides a cross-sectional view along a longitudinal axis $A_A$ of the tool 100; and FIG. 6 provides a cross-sectional view of the tool 100 along line 6-6 in FIG. 5.

The tool 100 generally includes a body 102 and a force section 132. The body 102 of the tool 100 includes an alignment portion 124 that defines a longitudinal axis $A_A$ and a cross-sectional shape. The cross-sectional shape, as may be most clearly seen in FIG. 6, is complementary to a slot defined in the rotor wheel 34. More particularly, the cross-sectional shape is complementary to the dovetail slot 35 defined in the first stage rotor wheel 34. Such a construction allows the alignment portion 124 to slidably couple the body 102 of the tool 100 to the rotor wheel 34 when positioned in the dovetail slot 35. Accordingly, when the alignment portion 124 is positioned in the slot 35, the body 102 of the tool 100 may only move in a direction substantially parallel to the longitudinal axis $A_A$ of the alignment portion 124.

The body 102 of the tool 100 additionally includes a connection portion 104. For the exemplary embodiment of FIGS. 4, 5, and 6, the connection portion comprises a clamp 106 configured to removably attach the tool 100 to the near flow path seal 60. The clamp 106 includes a top member 108 and a bottom member 110, the bottom member 110 including a pad 116 and a back stop 118 mounted therein. For the exemplary embodiment shown, the bottom member 110 is made integrally with the alignment portion 124 of the body 102. In addition, the clamp 106 includes a pin 112 extending through a midpoint of the top member 110 to form a hinge and a screw 114 for tightening the clamp 106 into a closed position, as shown in FIGS. 4 and 5. A spring member 119 is provided to bias the clamp 106 towards an open position.

The clamp 106 defines an upper clamping surface 120 and a lower clamping surface 122 (see particularly FIG. 5). The upper and lower clamping surfaces 120, 122 are each defined at an angle relative to the longitudinal axis $A_A$ of the alignment portion 124, such that when the clamp 106 is in a closed position, i.e., attached to the near flow path seal 60, the upper clamping surface 120 is substantially flush with an outer surface 75 of the near flow path seal 60 and the lower clamping surface 122 is substantially flush with an inner surface 76 of the near flow path seal 60. Such a construction may assist in minimizing any damage to the near flow path seals during removal by minimizing the moment created on the stem 67 during removal.

It should be appreciated, however, that the construction of the alignment portion 124 and connection portion 104 are by way of example only. In other exemplary embodiments of the present disclosure, the tool 100 may have any other suitable design for the alignment portion 124, the connection portion 104, or both. For example, the alignment portion 124 may be rigidly attached to the slot 35 and slidably attached to the rest of the body 102, including the connection portion 104. Additionally or alternatively, the connection portion 104 may have any other design suitable for contacting the component, or attaching the body 102 of the tool 100 to the component. Furthermore, although the exemplary tool 100 is shown positioned in the slot 35 defined in the first stage rotor wheel 34 and attached to the near flow path seal 60, in other exemplary embodiments of the present disclosure, the tool 100 may be configured to be positioned in a dovetail slot defined by the second, third, or fourth stage rotor wheels 41, 48, or 55. In any of such exemplary embodiments, the connection portion 104 of the tool 100 may also be designed to attach the tool 100 to any of the adjacent near flow path seals 62 or 64 at an appropriate angle such that the any damage to the near flow path seals is minimized during removal.

Referring now particularly to FIGS. 4 and 5, the exemplary tool 100 further includes a force section 132 connected to the body 102. The force section 132 is configured to transfer a force to the connection portion 104 of the body 102 in a direction substantially parallel to the longitudinal axis $A_A$ of the alignment portion 124 of the body. For the exemplary embodiments of FIGS. 4 and 5, the force section 132 comprises a slide hammer 134 attached to a rear end 130 of the body 102. The slide hammer 134 includes a rod 136 attached to the rear end 130 and defines a diameter $D_R$ and a longitudinal axis $A_R$. The longitudinal axis $A_R$ of the slide hammer 134 is substantially parallel to the longitudinal axis $A_A$ of the alignment portion 124 of the body 102. As may be seen in FIG. 5, the rod 136 is attached to the body 102 using a double threaded bolt 142 extending into the body 102 and into the rod 136.

The slide hammer 134 additionally includes a handle 138 defining a through hole 139, wherein the rod 136 extends through the through hole 139 of the handle 138. The shape of the through hole 139 is complementary to the shape of the rod 136, such that the handle 138 may move freely along the longitudinal axis $A_R$ of the rod 136. Further, the slide hammer 134 includes a stopper 140 positioned at a distal end 146 of the rod 136. The stopper 140 defines a diameter $D_S$ that is greater than the diameter $D_R$ of the rod 136 and the through hole 139, such that the stopper 140 prevents the handle 138 from sliding off the rod 136. The stopper 140 is attached to the rod using a bolt 144.

Such a construction may allow a user to generate a force by quickly transitioning the handle 138 between a first position 150 adjacent to the rear end 130 of the body 102 (as shown in FIG. 4 in solid lines) and a second position 152 adjacent to the stopper 140 (as shown in FIG. 4 in dotted lines). More particularly, a user may generate a force by moving the handle 138 from the first position 150 to the second position 152, hitting the stopper 140 with the handle 138. When the handle 138 contacts the stopper 140, a force will be transferred from the stopper 140 to the rod 136, and from the rod 136 to the body 102 of the tool 100. Such a force will be a pulling force in a direction away from the connection portion 104 of the body 102 and away from the near flow path seal 60. Additionally, due to the interaction of the alignment portion with the slot 35, the direction of the force will be substantially parallel to the longitudinal axis $A_A$ of the alignment portion 124.

It should be appreciated, however, that in other exemplary embodiments, the tool 100 may include any other suitable force section 132. For example, in other exemplary embodiments, the force section 132 may simply be a notch extending from the body 102 of the tool 100 configured to receive a force from an external source, such as a hammer or penning gun operated by a user, and transfer such force to the body 102 of the tool 100. It should also be appreciated that although for the exemplary embodiment of FIGS. 4 and 5, the tool 100 is shown exerting a pulling force on the near flow path seal 60 towards a forward end of the turbomachine 2, in other exemplary embodiments of the present disclosure, the tool 100 may be configured to exert a pulling force on the near flow path seal 60 towards an aft end of the turbomachine 2.

As may be seen most clearly in FIGS. 4 and 5, the tool 100 in combination with a first rotor wheel, i.e., the first near flow path seal rotor wheel 70, and a second rotor wheel positioned adjacent to the rotor wheel 70, i.e., the first stage rotor wheel 34, may comprise an assembly for removing a component, or near flow path seal 60, in the turbomachine 2.

Referring now to an exemplary method, an exemplary method for removing a component of a turbomachine is described. The method includes positioning a tool into a dovetail slot defined in a rotor wheel, such that a connection portion of the tool contacts a near flow path seal. The rotor wheel is positioned in a turbine portion of the turbomachine.

For the exemplary method, positioning more particularly includes sliding the tool into the slot defined by the rotor wheel. Referring still to the method, the method additionally includes attaching the tool to the near flow path seal using the connection portion of the tool. In certain exemplary embodiments of the present disclosure, the connection portion of the tool may include a clamp, and attaching the tool to the near flow path seal may include attaching the clamp to the near flow path seal.

The method further includes applying a force to a three section of the tool, such that the force is transferred from the force section to the connection portion. The tool may interact with the slot defined in the rotor wheel such that the force is transferred to the connection portion in a direction substantially parallel to a longitudinal axis of the tool. The force applied to the force section is applied using a slide hammer. Accordingly, the method further includes sliding a handle of the slide hammer away from the body of the tool until the handle hits a stopper. Such a step may allow the slide hammer to exert a pulling force on the tool in a direction away from the component, or near flow path seal. The exemplary method further includes applying the force to the component, or near flow path seal. In certain exemplary aspects, applying the force to the component may include transferring the force applied to the force section to the body of the tool, or more particularly, transferring the force to the connection portion of the body of the tool. The force may then be applied to the component. Such a process may allow for removal of the near flow path seal by pulling it out of the dovetail slot defined in the rotor wheel while minimizing any damage to the near flow path seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A tool for removing a component of a turbomachine, comprising:

a body, the body comprising a connection portion configured to contact the component; and an alignment portion defining a longitudinal axis and a cross-sectional shape, the cross-sectional shape being a dovetail shape complementary to a slot defined in a rotor wheel of the turbomachine; and a force section connected to the body and configured to transfer a force to the connection portion of the body in a direction substantially parallel to the longitudinal axis of the alignment portion.

2. The tool as in claim 1, wherein the alignment portion of the body is configured to slidably couple the body of the tool to the slot defined in the rotor wheel.

3. The tool as in claim 1, wherein the component is a near flow path seal and the slot defined in the rotor wheel is a dovetail slot configured to receive a rotor blade.

4. The tool as in claim 1, wherein the connection portion comprises a clamp removably attached to the component of the turbomachine.

5. The tool as in claim 4, wherein the clamp defines an upper clamping surface and a lower clamping surface, each defined at an angle greater than zero relative to the longitudinal axis of the alignment portion, and wherein when the clamp is in a closed position, the upper clamping surface is substantially flush with an outer surface of the component and the lower clamping surface is substantially flush with an inner surface of the component.

6. The tool as in claim 1, wherein the force section is configured to transfer a pulling force to the body of the tool in a direction away from the component.

7. The tool as in claim 1, wherein the force section comprises a slide hammer attached to a rear end of the alignment portion of the body.

8. The tool as in claim 7, wherein the slide hammer comprises:

a rod attached to the rear end of the alignment portion of the body and defining a diameter and a longitudinal axis substantially parallel to the longitudinal axis of the alignment portion, the rod defining a cross-sectional shape distinct from the cross-sectional shape of the alignment portion of the body;

a handle defining a through hole, wherein the rod extends through the through hole of the handle; and a stopper positioned at a distal end of the rod, the stopper defining a diameter that is greater than the diameter of the rod.

9. A method for removing a component of a turbomachine, comprising: positioning a tool into a slot defined in a rotor wheel of the turbomachine such that a connection portion of the tool contacts the component, the tool defining a longitudinal axis;

applying a force to a force section of the tool, the force being transferred from the force section to the connection portion in a direction substantially parallel to the longitudinal axis of the tool;

applying the force to the component of the turbomachine using the tool.

10. The method as in claim 9, further comprising:

attaching the tool to the component using the connection portion of the tool.

11. The method as in claim 10, wherein the connection portion of the tool comprises a clamp.

12. The method as in claim 11, wherein the clamp defines an upper clamping surface and a lower clamping surface, each defined at an angle relative to the longitudinal axis of the alignment portion, and wherein when the clamp is in a closed position, the upper clamping surface is substantially flush with an outer surface of the component and the lower clamping surface is substantially flush with an inner surface of the component.

13. The method as in claim 9, wherein the component is a near flow path seal and the slot defined in the rotor wheel is a dovetail slot configured to receive a rotor blade.

14. The method as in claim 9, wherein positioning the tool into the slot defined in the rotor wheel comprises sliding the tool into the slot defined in the rotor wheel such that the tool is slidably coupled to the rotor wheel.

15. The method as in claim 9, wherein the force section comprises a slide hammer attached to a rear end of the tool.

16. The method as in claim 15, further comprising:

sliding a handle of the slide hammer away from a body portion of the tool until the handle hits a stopper, such that the slide hammer exerts a pulling force on the tool in a direction away from the component.

17. An assembly for removing a component in a turbomachine, comprising:

a first rotor wheel, the component being slidably coupled to the first rotor wheel;

a second rotor wheel positioned adjacent to the first rotor wheel, the second rotor wheel defining a slot; and a removal tool comprising a body, the body comprising a connection portion in contact with the component; and an alignment portion positioned in the slot defined in the second rotor wheel, the alignment portion defining a longitudinal axis and a cross-sectional shape, the cross-sectional shape being complementary to the slot defined in the second rotor wheel; and a force section connected to the body and configured to transfer a force to the connection portion of the body in a direction substantially parallel to the longitudinal axis of the alignment portion.

18. The assembly as in claim 17, wherein the alignment portion of the body is slidably coupled to the slot defined in the rotor wheel.

19. The assembly as in claim 17, wherein the connection portion comprises a clamp and the component comprises a near flow path seal, and wherein the clamp attaches the removal tool to the near flow path seal.

20. The assembly as in claim 19, wherein the clamp defines an upper clamping surface and a lower clamping surface, each defined at an angle relative to the longitudinal axis of the alignment portion, and wherein when the clamp is in a closed position the upper clamping surface is substantially flush with an outer surface of the near flow path seal and the lower clamping surface is substantially flush with an inner surface of the near flow path seal.

* * * * *